United States Patent
Murakami

(10) Patent No.: US 9,316,256 B2
(45) Date of Patent: Apr. 19, 2016

(54) LIQUID-LUBRICATED BEARING AND VEHICLE PINION SHAFT SUPPORT DEVICE

(71) Applicant: JTEKT CORPORATION, Osaka-shi, Osaka (JP)

(72) Inventor: Masayuki Murakami, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/133,142

(22) Filed: Dec. 18, 2013

(65) Prior Publication Data

US 2014/0187374 A1    Jul. 3, 2014

(30) Foreign Application Priority Data

Dec. 27, 2012  (JP) ................................. 2012-285775

(51) Int. Cl.
*F16H 48/38*    (2012.01)
*F16C 33/66*    (2006.01)
*F16C 33/78*    (2006.01)
(Continued)

(52) U.S. Cl.
CPC ......... *F16C 33/6659* (2013.01); *F16C 33/6674* (2013.01); *F16C 33/7813* (2013.01); *F16C 33/7893* (2013.01); *F16H 57/0471* (2013.01); *F16C 19/364* (2013.01); *F16C 19/548* (2013.01); *F16C 2361/61* (2013.01); *F16H 57/0483* (2013.01); *F16H 2048/423* (2013.01)

(58) Field of Classification Search
CPC ......... F16H 57/04; F16H 48/38; B60K 17/16; F16C 33/6659

USPC .......... 384/470, 571, 572, 576; 475/159, 160, 475/161
See application file for complete search history.

(56) References Cited

U.S. PATENT DOCUMENTS 3,420,589 A * 1/1969 Williams et al. .............. 384/620
4,317,601 A * 3/1982 Faigley, Jr. .................... 384/576
(Continued)

FOREIGN PATENT DOCUMENTS

DE          7638179      *  6/1977
EP       1 574 729 A1       9/2005
(Continued)

OTHER PUBLICATIONS

Feb. 27, 2014 Search Report issued in European Patent Application No. 13198824.
(Continued)

*Primary Examiner* — Colby M Hansen
(74) *Attorney, Agent, or Firm* — Oliff PLC

(57) ABSTRACT

An outer lubricating liquid inflow passage that provides communication between an outside of a liquid-lubricated bearing and a rolling element arrangement chamber is formed between an outer ring and a cage, on the lubricating liquid inflow side. The outer lubricating liquid inflow passage has an annular axially extending outer passage portion that extends in the axial direction, and an annular radially extending outer passage portion. The radially extending outer passage portion communicates with a rolling element-side axial end portion of the axially extending outer passage portion. The radially extending outer passage portion extends from the axially extending outer passage portion to the rolling element arrangement chamber inward in the radial direction of the outer ring. A labyrinth is formed by the axially extending outer passage portion and the radially extending outer passage portion.

18 Claims, 2 Drawing Sheets

(51) Int. Cl.
*F16H 57/04* (2010.01)
*F16H 48/42* (2012.01)
*F16C 19/36* (2006.01)
*F16C 19/54* (2006.01)

(56) References Cited

U.S. PATENT DOCUMENTS

| | | | |
|---|---|---|---|
| 4,462,643 A * | 7/1984 | Gilbert et al. | 384/576 |
| 7,175,351 B2 * | 2/2007 | Ono et al. | 384/571 |
| 7,645,074 B2 * | 1/2010 | Chiba et al. | 384/571 |
| 7,722,257 B2 * | 5/2010 | Tabata et al. | 384/571 |
| 8,939,649 B2 | 1/2015 | Uozumi | |
| 2011/0069920 A1 * | 3/2011 | Aida | 384/572 |
| 2013/0330031 A1 * | 12/2013 | Mineno et al. | 384/470 |

FOREIGN PATENT DOCUMENTS

| | | |
|---|---|---|
| EP | 2270347 A1 | 1/2011 |
| GB | 2 073 828 A | 10/1981 |
| JP | A-09-303407 | 11/1997 |
| JP | A-11-048805 | 2/1999 |
| WO | 2012/039282 A1 | 3/2012 |
| WO | WO2012/120996 * | 9/2012 |

OTHER PUBLICATIONS

May 21, 2015 Search Report issued in European Patent Application No. 13198824.8.

* cited by examiner

LIQUID-LUBRICATED BEARING AND VEHICLE PINION SHAFT SUPPORT DEVICE

INCORPORATION BY REFERENCE

The disclosure of Japanese Patent Application No. 2012-285775 filed on Dec. 27, 2012 including the specification, drawings and abstract, is incorporated herein by reference in its entirety.

BACKGROUND OF THE INVENTION

1. Field of the Invention

The invention relates to a liquid-lubricated bearing that includes an outer ring, an inner ring, and rolling elements. The invention also relates to a vehicle pinion shaft support device that includes a pinion shaft, such as a differential gear unit, a transaxle unit, or a transfer case.

2. Description of the Related Art

A conventional liquid-lubricated bearing that supports a pinion shaft of a differential gear unit is described in Japanese Patent Application Publication No. 11-48805 (JP 11-48805 A). A large amount of oil is sealed in the differential gear unit to reliably prevent seizure of components. The liquid-lubricated bearing is supplied with the oil in a differential case, which is thrown upward by a ring gear of the differential gear unit and then flows through an oil introduction passage.

The liquid-lubricated bearing is provided in the differential gear unit in which a large amount of oil is present. Therefore, there is a possibility that an excessive amount of oil will be supplied to the liquid-lubricated bearing, which increases the stirring resistance, resulting in an increase in the rotary torque. This may increase the operating cost of the differential gear unit, resulting in poor fuel economy of a vehicle that includes the differential gear unit.

SUMMARY OF THE INVENTION

One object of the invention is to provide a liquid-lubricated bearing configured such that the stirring resistance is reduced and thus the rotary torque is reduced, thereby reducing the operating cost, and a vehicle pinion shaft support device configured such that the operating cost is reduced.

A liquid-lubricated bearing according to an aspect of the invention includes: an inner ring having a raceway surface formed in an outer peripheral face of the inner ring; an outer ring disposed radially outward of the inner ring, and having a raceway surface formed in an inner peripheral face of the outer ring; rolling elements disposed between the raceway surface of the inner ring and the raceway surface of the outer ring; and a cage having pockets that accommodate the rolling elements. Lubricating liquid flows through a space between the outer ring and the cage from one side in an axial direction of the liquid-lubricated bearing to the other side in the axial direction. An outer lubricating liquid inflow passage that provides communication between an outside of the liquid-lubricated bearing and a rolling element arrangement chamber in which the rolling elements are arranged, is formed between the outer ring and the cage, on a lubricating liquid inflow side in the axial direction. The outer lubricating liquid inflow passage has: an annular axially extending outer passage portion that extends in the axial direction; and an annular radially extending outer passage portion that communicates with a rolling element-side axial end portion of the axially extending outer passage portion, and that extends from the axially extending outer passage portion to the rolling element arrangement chamber inward in a radial direction of the outer ring. A labyrinth is formed by the axially extending outer passage portion and the radially extending outer passage portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described in detail with reference to the accompanying drawings.

Figure 1:
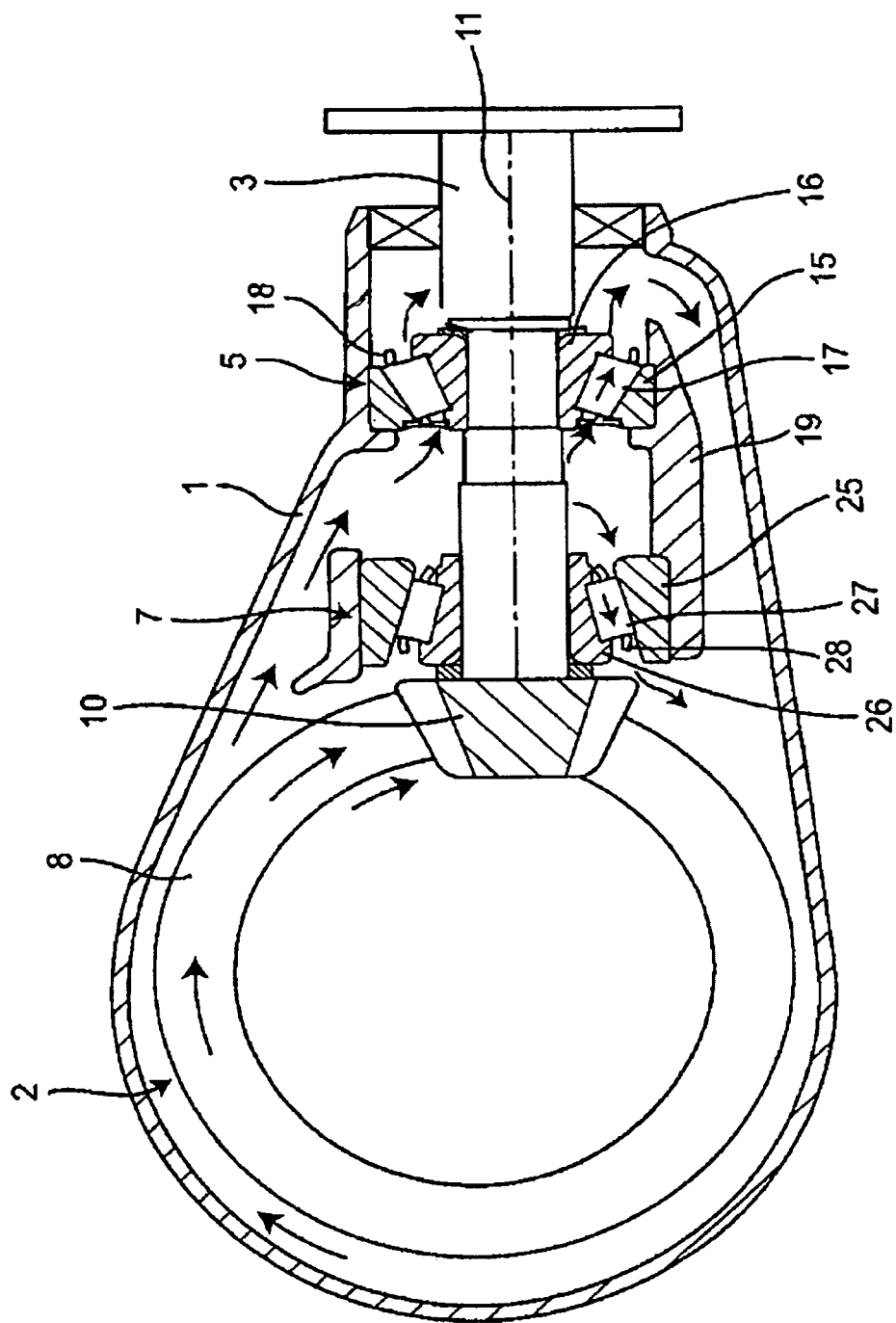
FIG. 1 is a vertical sectional view including a central axis of a pinion shaft of a differential gear unit that is an embodiment of a vehicle pinion shaft support device according to the invention.

FIG. 1 is a vertical sectional view including a central axis 11 of a pinion shaft 3 of a differential gear unit that is an embodiment of a vehicle pinion shaft support device according to the invention. In FIG. 1, arrows indicate flows of oil that is an example of lubricating liquid.

The differential gear unit includes a case 1, a differential mechanism 2, the pinion shaft 3, a lubricated tapered roller bearing 5 (hereinafter, simply referred to as "tapered roller bearing 5"), which is as an example of a liquid-lubricated bearing, and a tapered roller bearing 7.

The differential mechanism 2 is disposed in the case 1. The differential mechanism 2 includes, for example, a ring gear 8 and side gears (not illustrated). The ring gear 8 meshes with a pinion gear 10 of the pinion shaft 3. The power from a drive shaft is transmitted to the differential mechanism 2 via the pinion gear 10 of the pinion shaft 3.

The tapered roller bearing 5 includes an outer ring 15, an inner ring 16, and a plurality of tapered rollers 17. The outer ring 15 is fixedly fitted to an inner wall 19 in the case 1. The inner ring 16 is fixedly fitted to the pinion shaft 3. The tapered rollers 17 are held between a tapered raceway surface of the outer ring 15 and a tapered raceway surface of the inner ring 16 by a cage 18, and disposed at intervals in the circumferential direction. The tapered roller bearing 5 is disposed on a tail-side portion of the pinion shaft 3, that is, on a portion of the pinion shaft 3, which is on the opposite side of the pinion shaft 3 from the pinion gear 10. The pinion shaft 3 is rotatably supported by the tapered roller bearing 5.

The tapered roller bearing 7 includes an outer ring 25, an inner ring 26, and a plurality of tapered rollers 27. The tapered rollers 27 are held between a tapered raceway surface of the outer ring 25 and a tapered raceway surface of the inner ring 26 by a cage 28, and disposed at intervals in the circumferential direction. The tapered roller bearing 7 is disposed on a head-side portion of the pinion shaft 3, that is, on a pinion gear 10-side portion of the pinion shaft 3. The pinion shaft 3 is rotatably supported by the tapered roller bearing 7

In the differential gear unit having the above-described configuration, the power is transmitted from the drive shaft to the differential mechanism 2 through the pinion shaft 3 to drive the differential mechanism 2. The differential gear unit appropriately adjusts the difference in rotational speed between two wheel shafts (not illustrated) (extending in a direction perpendicular to the sheet on which FIG. 1 is drawn) connected to joints disposed on respective lateral sides of the differential mechanism 2.

In the differential gear unit, the oil, stored therein and having a certain level while the differential gear unit is not operating, is thrown up as the ring gear 8 rotates and is circulated in the directions indicated by arrows in FIG. 1 through an oil lubrication passage in the case 1 while the differential gear unit is operating. In the differential gear unit, the oil is circulated so as to flow through the pinion gear 10, the ring gear 8 of the differential mechanism 2, the side gears (not illustrated) of the differential mechanism 2, the tapered roller bearing 5, and the tapered roller bearing 7 to prevent seizure of the gears and the tapered roller bearings 5, 7 during operation of the differential gear unit.

Figure 2:
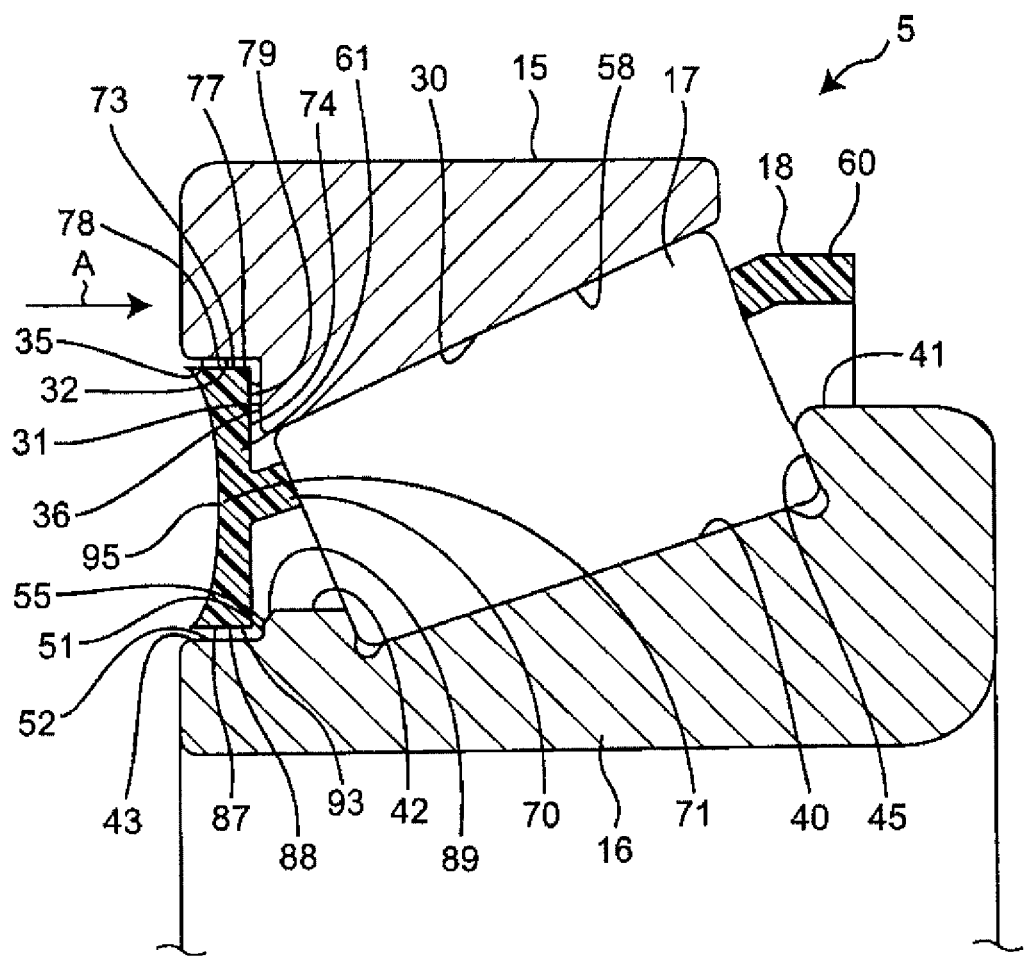
FIG. 2 is an enlarged schematic sectional view of a tapered roller bearing disposed on a portion of the pinion shaft, which is on the opposite side of the pinion shaft from a pinion gear in the differential gear unit, the sectional view taken along the axial direction of the tapered roller bearing.

FIG. 2 is an enlarged schematic sectional view of the tapered roller bearing 5, taken along its axial direction.

As described above, the tapered roller bearing 5 includes the outer ring 15, the inner ring 16, the tapered rollers 17, and the cage 18. The outer ring 15 is fixedly fitted to the inner wall 19. The inner ring 16 is fixedly fitted to the pinion shaft 3.

As illustrated in FIG. 2, the outer ring 15 has a recess 35 formed in an oil inflow-side portion of its inner peripheral face. More specifically, the outer ring 15 has a tapered inner periphery raceway surface 30, an outer ring side step portion 31, and a cylindrical inner peripheral face 32. The outer ring side step portion 31 is located on the small-diameter side of the tapered inner periphery raceway surface 30. The outer ring side step portion 31 extends in the radial direction and defines an outer ring side axial end face 36. The cylindrical inner peripheral face 32 extends outward in the axial direction from a radially outer end of the outer ring side step portion 31 in a direction away from the tapered rollers 17. The cylindrical inner peripheral face 32 extends in the axial direction from an oil inflow-side axial end of the outer ring 15 to the outer ring side step portion 31.

The inner ring 16 has a tapered outer periphery raceway surface 40, a large rib portion 41, and a small rib portion 42. The large rib portion 41 is located on the large-diameter side of the tapered outer periphery raceway surface 40. The small rib portion 42 is located on the small-diameter side of the tapered outer periphery raceway surface 40. The large rib portion 41 has a roller guide face 45 that comes into contact with a large end face of each tapered roller 17 and guides the large end face of the tapered roller 17 during operation of the tapered roller bearing 5.

The small rib portion 42 has a recess 43 formed in its outer peripheral face. The recess 43 opens outward in the axial direction and opens outward in the radial direction. More specifically, the small rib portion 42 of the inner ring 16 has an inner ring side step portion 51 and a cylindrical outer peripheral face 52. The inner ring side step portion 51 extends in the radial direction and defines an inner ring side axial end face 55. The cylindrical outer peripheral face 52 extends outward in the axial direction from a radially inner end of the inner ring side step portion 51 in a direction away from the tapered rollers 17. The cylindrical outer peripheral face 52 extends in the axial direction from an oil inflow-side axial end of the inner ring 16 to the inner ring side step portion 51.

The cage 18 is made of resin and formed by injection molding. The cage 18 has a large-diameter annular portion 60, a small-diameter annular portion 61, and a plurality of cage bars (not illustrated). The cage bars connect the large-diameter annular portion 60 and the small-diameter annular portion 61 to each other. The cage bars are located at intervals in the circumferential direction of the large-diameter annular portion 60. The large-diameter annular portion 60 is located downstream of the tapered rollers 17 in the oil flow direction. As illustrated in FIG. 2, the large-diameter annular portion 60 extends generally in the axial direction.

The small-diameter annular portion 61 is located upstream of the tapered rollers 17 in the oil flow direction. The small-diameter annular portion 61 may function as an upstream-side annular portion. The minimum inner diameter of the small-diameter annular portion 61 is smaller than that of the large-diameter annular portion 60. The small-diameter annular portion 61 has a generally T-shape in a section taken along the axial direction. More specifically, the small-diameter annular portion 61 has a body portion 70 and an oil inflow restriction portion 71. A tapered roller 17-side axial end face of the body portion 70 constitutes part of a roller guide face of the cage 18, which defines pockets.

The oil inflow restriction portion 71 is connected to an end of the body portion 70, which is on the opposite side of the body portion 70 from the tapered rollers 17 in the axial direction. The oil inflow restriction portion 71 extends in the radial direction. The oil inflow restriction portion 71 has a portion that overlaps with the outer ring side axial end face 36 of the recess 35 of the outer ring 15 in the axial direction. As illustrated in FIG. 2, an outer lubricating liquid inflow passage 77 is formed between the oil inflow restriction portion 71 and the outer ring 15 so that a roller arrangement chamber 58, which may function as a rolling element arrangement chamber, communicates with the outside of the tapered roller bearing 5. Although the position of each tapered roller 17 is restricted by the force from the cage 18, the roller arrangement chamber 58 is defined as a region where the tapered rollers 17 can be present in the liquid-lubricated bearing.

The outer lubricating liquid inflow passage 77 has an axially extending outer passage portion 78 and a radially extending outer passage portion 79. The oil inflow restriction portion 71 has a cylindrical outer peripheral face 73 and an axially inner end face 74. The axially inner end face 74 is an annular end face that extends in the radial direction. The axially inner end face 74 is connected to a tapered roller 17-side axial end of the cylindrical outer peripheral face 73. The axially extending outer passage portion 78 is defined by the cylindrical inner peripheral face 32 of the outer ring 15 and the cylindrical outer peripheral face 73 of the oil inflow restriction portion 71.

As illustrated in FIG. 2, the axially extending outer passage portion 78 is an annular passage. The axially extending outer passage portion 78 extends generally in the axial direction. The radially extending outer passage portion 79 is defined by the outer ring side axial end face 36 of the recess 35 of the outer ring 15 and the axially inner end face 74 of the oil inflow restriction portion 71. The radially extending outer passage portion 79 communicates with a tapered roller 17-side axial end portion of the axially extending outer passage portion 78. The radially extending outer passage portion 79 is an annular passage. The radially extending outer passage portion 79 extends from the axially extending outer passage portion 78 to the roller arrangement chamber 58 inward generally in the radial direction of the outer ring 15. The axially extending outer passage portion 78 and the radially extending outer passage portion 79 form a labyrinth. In the small-diameter annular portion 61 (oil inflow restriction portion 71), a portion located radially outward of the portion to which the cage bars are connected constitutes a radially outward extending portion. The radially outward extending portion extends in the radial direction.

The oil inflow restriction portion 71 has a portion that overlaps with the inner ring side axial end face 55 of the recess 43 of the inner ring 16 in the axial direction. As illustrated in FIG. 2, an inner lubricating liquid inflow passage 87 is formed between the oil inflow restriction portion 71 and the inner ring 16 so that the roller arrangement chamber 58 communicates with the outside of the tapered roller bearing 5. The inner lubricating liquid inflow passage 87 has an axially extending inner passage portion 88 and a radially extending inner passage portion 89. The oil inflow restriction portion 71 has a cylindrical inner peripheral face 93. The axially inner end face 74 is connected to a tapered roller 17-side axial end of the cylindrical inner peripheral face 93. The axially extending inner passage portion 88 is defined by the cylindrical outer peripheral face 52 of the inner ring 16 and the cylindrical inner peripheral face 93 of the oil inflow restriction portion 71.

As illustrated in FIG. 2, the axially extending inner passage portion 88 is an annular passage. The axially extending inner passage portion 88 extends in the axial direction. The radially extending inner passage portion 89 is defined by the inner ring side axial end face 55 of the recess 43 of the inner ring 16 and the axially inner end face 74 of the oil inflow restriction portion 71. The radially extending inner passage portion 89 communicates with a tapered roller 17-side axial end portion of the axially extending inner passage portion 88. The radially extending inner passage portion 89 is an annular passage. The radially extending inner passage portion 89 extends from the axially extending inner passage portion 88 to the roller arrangement chamber 58 outward generally in the radial direction of the inner ring 16. The axially extending inner passage portion 88 and the radially extending inner passage portion 89 form a labyrinth. The labyrinth is defined as a passage having a cross section (section that is perpendicular to the direction in which the passage extends) that is narrow enough to restrict passage of the lubricating liquid. "Labyrinth" is a basic term widely used by persons skilled in the art to signify the above-described passage.

As illustrated in FIG. 2, the entirety of the oil inflow restriction portion 71 overlaps with the recess 35 of the outer ring 15 in the radial direction, and overlaps with the recess 43 of the inner ring 16 in the radial direction. An axial end face 95 of the oil inflow restriction portion 71, which is on the opposite side of the oil inflow restriction portion 71 from the tapered rollers 17, is formed as a concave face that is a curved face.

As illustrated in FIG. 2, the end face 95 is formed such that the axial position of the end face 95 is further axially outward, in a direction from the radial center of the end face 95 outward in the radial direction. In addition, the end face 95 is formed such that the axial position of the end face 95 is further axially outward, in a direction from the radial center of the end face 95 inward in the radial direction. The end face 95 constitutes an outer side guide face that guides the oil in such a direction that the oil moves away from the tapered roller bearing 5.

The cage 18 is made of an elastic material that has such an elasticity that the cage 18 is allowed to be fitted into the outer ring 15. The cage 18 is made of, for example, polyacetal (or polyoxymethylene, POM), polypropylene (PP), nylon (or polyamide, PA), polybutylene terephtalate (PBT), a polytetrafluoroethylene resin (PTFE), poly ether ether ketone (PEEK), etc. The cage 18 is a single-piece member that is formed by injection molding.

The tapered roller bearing 5 is assembled in the following manner. First, a cage assembly including the inner ring 16, the tapered rollers 17, and the cage 18 is formed. Then, the outer ring 15 is axially moved relative to the cage assembly in a direction indicated by an arrow A. The outer ring 15 is passed through the radially outer peripheral side of the oil inflow restriction portion 71 of the cage 18 while the oil inflow restriction portion 71 is deformed. In this way, the outer ring 15 is fitted to the cage assembly.

Note that, in FIG. 2, the outer ring side step portion 31 of the outer ring 15 is illustrated with exaggeration, and the radial length of the outer ring side step portion 31 is illustrated so as to be larger than its actual length. The actual length of the outer ring side step portion 31 of the outer ring 15 is set smaller than the permissible amount of radial elastic deformation of the cage 18, which occurs when the outer ring 15 is fitted to the cage assembly.

According to the embodiment described above, on the oil inflow side of the tapered roller bearing 5, between the outer ring 15 and the cage 18, there is the labyrinth formed of the axially extending outer passage portion 78 that extends in the axial direction and the radially extending outer passage portion 79 that extends from the tapered roller 17-side axial end of the axially extending outer passage portion 78 inward in the radial direction. Therefore, the oil is restrained from passing through a space between the outer ring 15 and the cage 18. This reduces the stirring resistance, resulting in reduction of the rotary torque. As a result, the operating cost is reduced.

Because the lubricating liquid is restrained from passing through the space between the outer ring 15 and the cage 18, the possibility that the lubricating liquid thrown radially outward by a centrifugal force will enter the tapered roller bearing 5 is significantly reduced, especially in the case where the inner ring 16 is configured to rotate as in the present embodiment. Therefore, the rotary torque is significantly reduced.

According to the embodiment described above, on the oil inflow side of the tapered roller bearing 5, between the inner ring 16 and the cage 18, there is the labyrinth formed of the axially extending inner passage portion 88 that extends in the axial direction and the radially extending inner passage portion 89 that extends from the tapered roller 17-side axial end of the axially extending inner passage portion 88 outward in the radial direction. Therefore, the oil is restrained from passing through a space between the inner ring 16 and the cage 18. This further reduces the stirring resistance, resulting in reduction of the rotary torque. As a result, the operating cost is further reduced.

According to the embodiment described above, the recess 35 is formed in the outer ring 15, at a portion on the oil inflow side in the axial direction, and the oil inflow-side axial end face of the outer ring 15 has the outer ring side step portion 31. With this configuration, the axially extending outer passage portion 78 and the radially extending outer passage portion 79 are formed easily.

According to the embodiment described above, on the oil inflow side, the axial end face 95 of the oil inflow restriction portion 71, which is on the opposite side of the oil inflow restriction portion 71 from the tapered rollers 17, is formed such that the axial position of the end face 95 is further axially outward, in the directions from the radial center of the end face 95 outward and inward in the radial direction. Thus, the oil is guided in such a direction that the oil moves away from the tapered roller bearing 5. Consequently, the oil that has come into contact with the end face 95 is smoothly guided and scattered in such a direction that the oil moves away from the tapered roller bearing 5. Therefore, entry of the oil into the tapered roller bearing 5 is further suppressed, resulting in further reduction of the rotary torque.

According to the embodiment described above, because the cage 18 is a single-piece member, the cage 18 is easily formed by a well-known molding method such as injection molding. In addition, because the cage 18 is made of an elastic material having such an elasticity that the cage 18 can be fitted into the outer ring 15, the cage 18 is reliably fitted into the outer ring 15.

In the embodiment described above, the axially outer end face 95 of the small-diameter annular portion 61 of the cage 18, the end face 95 serving as the outer side guide face, is formed in a concave face. However, the outer side guide face according to the invention may be formed in a V-shaped face that opens outward in the axial direction or an isosceles trapezoid face that opens outward in the axial direction, in a section taken along the axial direction of the tapered roller bearing 5.

In the embodiment described above, the entirety of the axially outer end face 95 of the small-diameter annular portion 61 of the cage 18, the end face 95 serving as the outer side guide face, is formed in a concave face in which a radially center portion is a bottom portion. However, the outer side guide face in the invention need not be formed of the entirety of the axially outer end face of the small-diameter annular portion of the cage, and may be formed of part of the axially outer end face of the small-diameter annular portion of the cage. For example, the outer side guide face may be a portion of the axially outer end face of the small-diameter annular portion of the cage, the axial position of the portion being located further axially outward, in a direction outward in the radial direction.

In the embodiment described above, the entirety of the outer side guide face of the cage 18 overlaps with the recess 35 of the outer ring 15 in the radial direction. However, in the invention, the entirety of the outer side guide face of the small-diameter annular portion of the cage need not overlap with the recess of the outer ring in the radial direction, and part of the outer side guide face may be located axially outward of an axially outer end of the outer ring. With this configuration, the lubricating liquid is efficiently scattered in such a direction that the lubricating liquid moves away from the bearing. In the embodiment described above, the guide face of the cage 18 is accommodated in an accommodation space. However, a radially outer end portion of the guide face of the cage 18 may protrude outward from the accommodation space in the axial direction. With this configuration, the lubricating liquid is reliably guided in such a direction that the lubricating liquid moves away from the bearing.

In the embodiment described above, the cage 18 is a single-piece member and made of an elastic material having such an elasticity that the cage 18 can be fitted into the outer ring 15. However, the cage in the invention need not be a single-piece member, and need not be formed by integral molding. For example, the cage in the invention may be formed of two pieces, and a radially outer portion (annular portion) of the small-diameter annular portion of the cage may be formed as a member that is separate from the body portion of the cage. In this way, the radially outer portion of the small-diameter annular portion of the cage, which is a member separate from the body portion, can be fitted to the body portion at the last stage of the assembly of the bearing, and thus the outer ring is easily fitted to the cage assembly without causing deformation of a portion of the cage other than the separate component when the outer ring is fitted to the cage assembly. The radially outer portion of the small-diameter annular portion of the cage (the separate member of the cage) may be spigot-fitted to the body portion of the cage (the portion of the cage other than the separate member) to be integrated with the body portion of the cage. Alternatively, the radially outer portion of the small-diameter annular portion of the cage may be press-fitted to the body portion of the cage to be integrated with the body portion of the cage. Alternatively, the radially outer portion of the small-diameter annular portion of the cage may be melted by heat to be integrated with the body portion of the cage. It is needless to say that when the cage is formed by integrating multiple members instead of being formed by integral molding, the material of the cage may be either resin or metal.

In the embodiment described above, the lubricating liquid is oil. However, the lubricating liquid in the invention may be lubricating liquids other than oil, such as cleaning solution.

In the embodiment described above, both of the axially extending outer passage portion 78 and the axially extending inner passage portion 88 extend substantially precisely in the axial direction. However, in the invention, at least one of the axially extending outer passage portion and the axially extending inner passage portion may extend in a direction oblique to the axial direction or in a direction that contains a radial extending component in the radial direction.

In the embodiment described above, both of the radially extending outer passage portion 79 and the radially extending inner passage portion 89 extend substantially precisely in the radial direction. However, in the invention, at least one of the radially extending outer passage portion and the radially extending inner passage portion may extend in a direction oblique to the radial direction or in the direction that contains an extending component in the axial direction.

In the embodiment described above, the inner ring 16 has the small rib portion 42 formed on the small-diameter side portion of the tapered outer periphery raceway surface 40. However, the inner ring in the invention may be formed such that the small rib portion is not formed on the small-diameter side portion of the tapered outer periphery raceway surface.

In the differential gear unit according to the embodiment described above, the structure of the invention is applied only to the tapered roller bearing 5 among the tapered roller bearings 5, 7 arranged on respective two rows, the tapered roller bearing 5 being disposed on a portion of the pinion shaft 3, which is on the opposite side of the pinion shaft 3 from the pinion gear 10. However, in the vehicle pinion shaft support device according to the invention, the liquid-lubricated bearing according to the invention may be applied to at least one of two tapered roller bearings that support the pinion shaft.

In the embodiment described above, rolling elements are the tapered rollers 17, and the liquid-lubricated bearing is the tapered roller bearing 5. However, the liquid-lubricated bearing in the invention may be a double row ball bearing. The small-diameter annular portion of the cage may be a small-diameter annular portion of the cage that holds the balls. When the invention is applied to the tapered roller bearing into which the lubricating liquid is easily flow by pumping action, the advantageous effects can be particularly notably provided.

In the embodiment described above, the vehicle pinion shaft support device including the tapered roller bearing 5 according to the invention is the differential gear unit. Alternatively, the vehicle pinion shaft support device including the liquid-lubricated bearing according to the invention may be a transaxle unit or a transfer case.

The liquid-lubricated bearing according to the invention is preferably applied to a bearing that supports a pinion shaft of a vehicle pinion shaft support device such as a differential gear unit, a transaxle unit, or a transfer case for a vehicle. Alternatively, the liquid-lubricated bearing according to the invention may be applied to bearings other than a bearing that supports a pinion shaft. In particular, when the liquid-lubricated bearing according to the invention is employed as a bearing used under the conditions that a large amount of oil with a relatively high viscosity flows into the bearing and the stirring resistance increases, the stirring resistance is significantly reduced. As a result, the fuel economy of the vehicle including the bearing is significantly increased.

When the liquid-lubricated bearing according to the invention is employed, the rotary torque of the liquid-lubricated bearing is reduced, and the operating cost is reduced.

According to the invention, it is possible to provide the liquid-lubricated bearing configured such that the stirring resistance is reduced and thus the rotary torque is reduced, thereby reducing the operating cost.

What is claimed is:

1. A liquid-lubricated bearing, comprising:
an inner ring having a raceway surface formed in an outer peripheral face of the inner ring;
an outer ring disposed radially outward of the inner ring, and having a raceway surface formed in an inner peripheral face of the outer ring;
rolling elements disposed between the raceway surface of the inner ring and the raceway surface of the outer ring; and
a cage having pockets that accommodate the rolling elements, wherein
lubricating liquid flows through a space between the outer ring and the cage from a first side in an axial direction of the liquid-lubricated bearing to a second side in the axial direction,
an outer lubricating liquid inflow passage that provides communication between an outside of the liquid-lubricated bearing and a rolling element arrangement chamber in which the rolling elements are arranged, is formed between the outer ring and the cage, on a lubricating liquid inflow side in the axial direction,
the outer lubricating liquid inflow passage has
an annular axially extending outer passage portion that extends in the axial direction, and
an annular radially extending outer passage portion that communicates with a rolling element-side axial end portion of the axially extending outer passage portion, and that extends from the axially extending outer passage portion to the rolling element arrangement chamber inward in a radial direction of the outer ring, and
a labyrinth is formed by the axially extending outer passage portion and the radially extending outer passage portion,
the cage has a first annular end portion extending in the axial direction, a second annular end portion extending in the radial direction, and a plurality of cage bars connecting the first annular end portion and the second annular end portion, the first annular end portion having a length extending generally in the axial direction, a diameter of the length of the first annular end portion being greater than a diameter of the second annular end portion,
the second annular end portion is located upstream of the rolling elements in a flow direction of the lubricating liquid,
an end face of the second annular end portion has an outer side guide face that guides the lubricating liquid in such a direction that the lubricating liquid flows away from the liquid-lubricated bearing, the end face being on an opposite side of the second annular end portion from the rolling elements in the axial direction,
the end face extends further upstream in the axial direction at a radially outward position of the end face relative to a radial center of the end face, and the end face extends further upstream in the axial direction at a radially inward position of the end face relative to the radial center of the end face,
an entirety of the outer side guide face of the second annular end portion is formed in a concave face,
the plurality of cage bars are connected to a connection portion of the second annular end portion and form an acute angle with a portion of the second annular end portion that extends radially outward from the connection portion, and
an axial thickness of the second annular end portion is greater at a radially outward portion of the second annular end portion than at the connection portion.

2. The liquid-lubricated bearing according to claim 1, wherein:
an inner lubricating liquid inflow passage that provides communication between the outside and the rolling element arrangement chamber is formed between the inner ring and the cage, on the lubricating liquid inflow side in the axial direction,
the inner lubricating liquid inflow passage has
an annular axially extending inner passage portion that extends in the axial direction, and
an annular radially extending inner passage portion that communicates with a rolling element-side axial end portion of the axially extending inner passage portion, and that extends from the axially extending inner passage portion to the rolling element arrangement chamber outward in a radial direction of the inner ring, and
a second labyrinth is formed by the axially extending inner passage portion and the radially extending inner passage portion.

3. The liquid-lubricated bearing according to claim 2, wherein:
the plurality of cage bars extend on a rolling element side from the second annular end portion and are located at intervals in a circumferential direction of the second annular end portion;
a radially outward extending portion of the second annular end portion is located radially outward of a portion of the second annular end portion, to which cage bars are connected, and extends in the radial direction;
a lubricating liquid inflow-side axial end portion of the outer ring has a recess;
a lubricating liquid inflow-side axial end face of the outer ring has an outer ring side step portion;
the axially extending outer passage portion has a portion defined by an outer peripheral face of the radially outward extending portion and the inner peripheral face of the outer ring that faces the outer peripheral face of the radially outward extending portion in the radial direction; and
the radially extending outer passage portion has a portion defined by a rolling element-side axial end face of the radially outward extending portion and the outer ring side step portion.

4. The liquid-lubricated bearing according to claim 3, wherein the cage is a single-piece member and made of an elastic material having such an elasticity that the cage is allowed to be fitted into the outer ring.

5. A vehicle pinion shaft support device comprising:
a case;
a differential mechanism that is provided in the case, and that includes a ring gear;
a pinion shaft having a pinion gear meshed with the ring gear of the differential mechanism; and the liquid-lubricated bearing according to claim 3, by which the pinion shaft is rotatably supported.

6. The liquid-lubricated bearing according to claim 2, wherein:
the plurality of cage bars extend on a rolling element side from the second annular end portion and are located at intervals in a circumferential direction of the second annular end portion.

7. The liquid-lubricated bearing according to claim 6, wherein the cage is a single-piece member and made of an elastic material having such an elasticity that the cage is allowed to be fitted into the outer ring.

8. A vehicle pinion shaft support device comprising:
a case;
a differential mechanism that is provided in the case, and that includes a ring gear;
a pinion shaft having a pinion gear meshed with the ring gear of the differential mechanism; and
the liquid-lubricated bearing according to claim 6, by which the pinion shaft is rotatably supported.

9. The liquid-lubricated bearing according to claim 2, wherein the cage is a single-piece member and made of an elastic material having such an elasticity that the cage is allowed to be fitted into the outer ring.

10. A vehicle pinion shaft support device comprising:
a case;
a differential mechanism that is provided in the case, and that includes a ring gear;
a pinion shaft having a pinion gear meshed with the ring gear of the differential mechanism; and
the liquid-lubricated bearing according to claim 2, by which the pinion shaft is rotatably supported.

11. The liquid-lubricated bearing according to claim 1, wherein:
the plurality of cage bars extend on a rolling element side from the second annular end portion and are located at intervals in a circumferential direction of the second annular end portion;
a radially outward extending portion of the second annular end portion is located radially outward of a portion of the second annular end portion, to which cage bars are connected, and extends in the radial direction;
a lubricating liquid inflow-side axial end portion of the outer ring has a recess;
a lubricating liquid inflow-side axial end face of the outer ring has an outer ring side step portion;
the axially extending outer passage portion has a portion defined by an outer peripheral face of the radially outward extending portion and the inner peripheral face of the outer ring that faces the outer peripheral face of the radially outward extending portion in the radial direction; and
the radially extending outer passage portion has a portion defined by a rolling element-side axial end face of the radially outward extending portion and the outer ring side step portion.

12. The liquid-lubricated bearing according to claim 11, wherein the cage is a single-piece member and made of an elastic material having such an elasticity that the cage is allowed to be fitted into the outer ring.

13. The liquid-lubricated bearing according to claim 1, wherein:
the plurality of cage bars extend on a rolling element side from the second annular end portion and are located at intervals in a circumferential direction of the second annular end portion.

14. The liquid-lubricated bearing according to claim 13, wherein the cage is a single-piece member and made of an elastic material having such an elasticity that the cage is allowed to be fitted into the outer ring.

15. A vehicle pinion shaft support device comprising:
a case;
a differential mechanism that is provided in the case, and that includes a ring gear;
a pinion shaft having a pinion gear meshed with the ring gear of the differential mechanism; and
the liquid-lubricated bearing according to claim 11, by which the pinion shaft is rotatably supported.

16. A vehicle pinion shaft support device comprising:
a case;
a differential mechanism that is provided in the case, and that includes a ring gear;
a pinion shaft having a pinion gear meshed with the ring gear of the differential mechanism; and
the liquid-lubricated bearing according to claim 13, by which the pinion shaft is rotatably supported.

17. The liquid-lubricated bearing according to claim 1, wherein the cage is a single-piece member and made of an elastic material having such an elasticity that the cage is allowed to be fitted into the outer ring.

18. A vehicle pinion shaft support device comprising:
a case;
a differential mechanism that is provided in the case, and that includes a ring gear;
a pinion shaft having a pinion gear meshed with the ring gear of the differential mechanism; and
the liquid-lubricated bearing according to claim 1, by which the pinion shaft is rotatably supported.

* * * * *